US006795863B1

(12) United States Patent
Doty, Jr.

(10) Patent No.: US 6,795,863 B1
(45) Date of Patent: Sep. 21, 2004

(54) SYSTEM, DEVICE AND METHOD FOR COMBINING STREAMING VIDEO WITH E-MAIL

(75) Inventor: Thomas R. Doty, Jr., Atlanta, GA (US)

(73) Assignee: Intline.Com, Inc., Atlanta, GA (US)

(*) Notice: Subject to any disclaimer, the term of this patent is extended or adjusted under 35 U.S.C. 154(b) by 563 days.

(21) Appl. No.: 09/635,562

(22) Filed: Aug. 10, 2000

Related U.S. Application Data

(60) Provisional application No. 60/147,815, filed on Aug. 10, 1999.

(51) Int. Cl.[7] ............................................... G06F 15/16
(52) U.S. Cl. ....................... 709/231; 709/206; 709/207; 709/219; 709/225
(58) Field of Search ............................... 709/225, 231, 709/219, 206, 207

(56) References Cited

U.S. PATENT DOCUMENTS

| | | | |
|---|---|---|---|
| 5,557,320 A | 9/1996 | Krebs ........................... 348/12 |
| 5,706,451 A | 1/1998 | Lightbody et al. ........... 395/327 |
| 5,760,823 A | 6/1998 | Brunson et al. .............. 348/14 |
| 5,778,054 A | 7/1998 | Kimura et al. ........... 379/93.23 |
| 5,781,245 A | 7/1998 | Van Der Weij et al. ..... 348/563 |
| 5,907,323 A | 5/1999 | Lawler et al. ............... 345/327 |
| 5,953,506 A | * 9/1999 | Kalra et al. .................. 709/231 |
| 5,966,120 A | 10/1999 | Arazi et al. ................. 345/327 |
| 5,977,989 A | 11/1999 | Lee et al. .................... 345/503 |
| 5,991,365 A | 11/1999 | Pizano et al. ............. 379/88.13 |
| 5,995,093 A | 11/1999 | Lambourne et al. ........ 345/327 |
| 5,999,985 A | 12/1999 | Sebestyen ................... 709/247 |
| 6,014,688 A | 1/2000 | Venkatraman et al. ...... 709/206 |
| 6,014,689 A | 1/2000 | Budge et al. ................ 709/206 |
| 6,018,774 A | 1/2000 | Mayle et al. ................ 709/250 |
| 6,173,317 B1 | * 1/2001 | Chaddha et al. ............. 709/219 |
| 6,366,914 B1 | * 4/2002 | Stern ........................... 707/10 |
| 6,370,487 B1 | * 4/2002 | Dorough ...................... 702/188 |
| 6,421,726 B1 | * 7/2002 | Kenner et al. .............. 709/225 |
| 6,477,550 B1 | * 11/2002 | Balasubramaniam et al. ........................... 715/513 |

* cited by examiner

*Primary Examiner*—Nabil El-Hady
(74) *Attorney, Agent, or Firm*—Hinkle & O'Bradovich, LLC

(57) ABSTRACT

A method and system for providing video streaming with e-mail on the Internet by distributing multiple bit-rate audio/video streams across the Internet via a combination of network architecture, hardware and software. Data is digitized, compressed, encoded, and then stored and/or transmitted in or through a video server. The processed data is then distributed by satellite, terrestrial methods, or wireless technology around the world by a smart server that recognizes the recipient computer's client player/decoder. The data is encoded into a form that can be viewed by multiple client players capable of viewing streaming video over the Internet. This method disseminates streaming video from a live source or an archive. The video screen for viewing the streaming video is embedded on the e-mail web site so that the person using the e-mail can view the streaming video while using the e-mail. The e-mail system also includes digital calendar data and simultaneously distributing the calendar data with the video data streams, thereby enabling the calendar data to be displayed simultaneously with the video data stream on the client recipient computers.

16 Claims, 7 Drawing Sheets

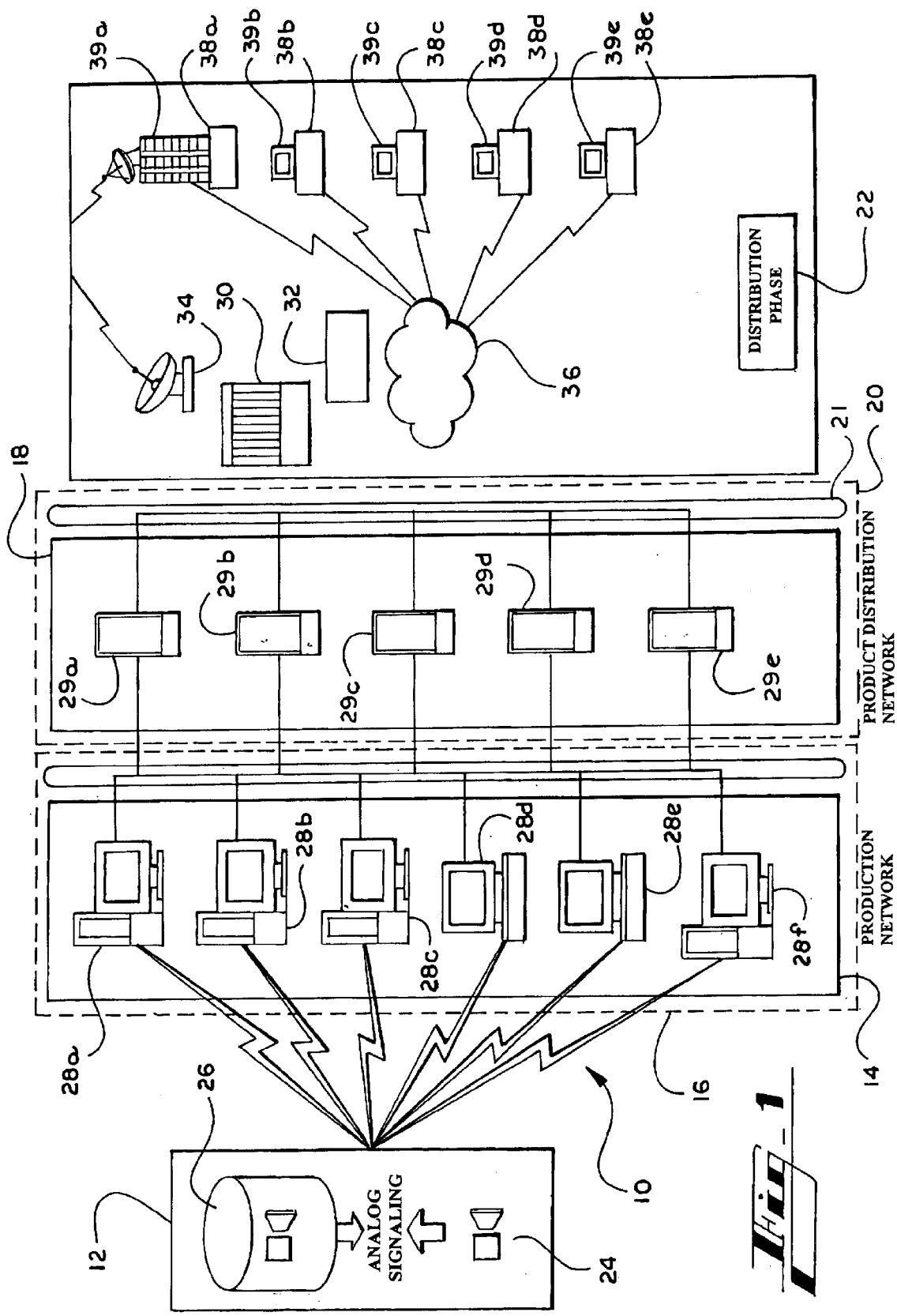

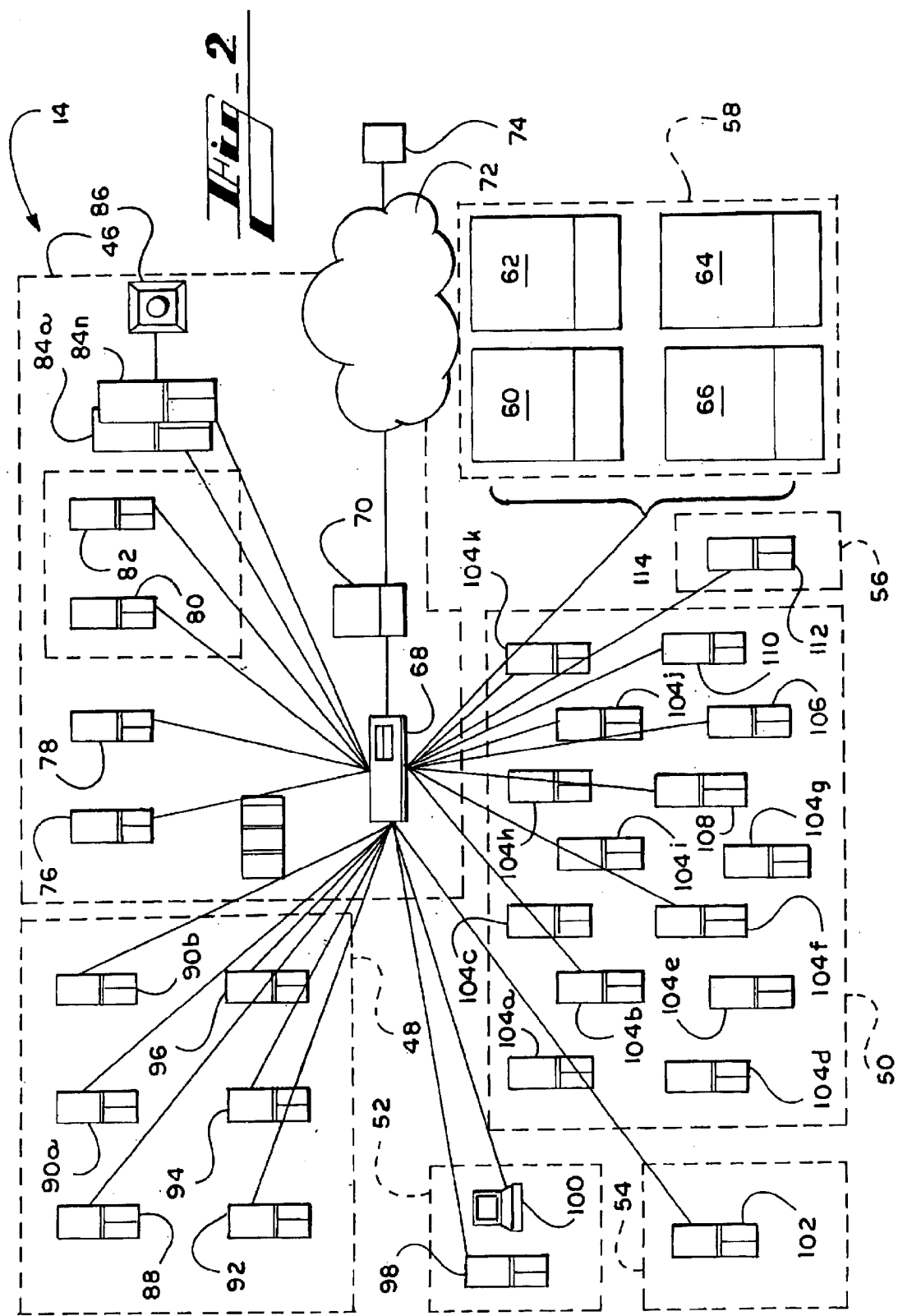

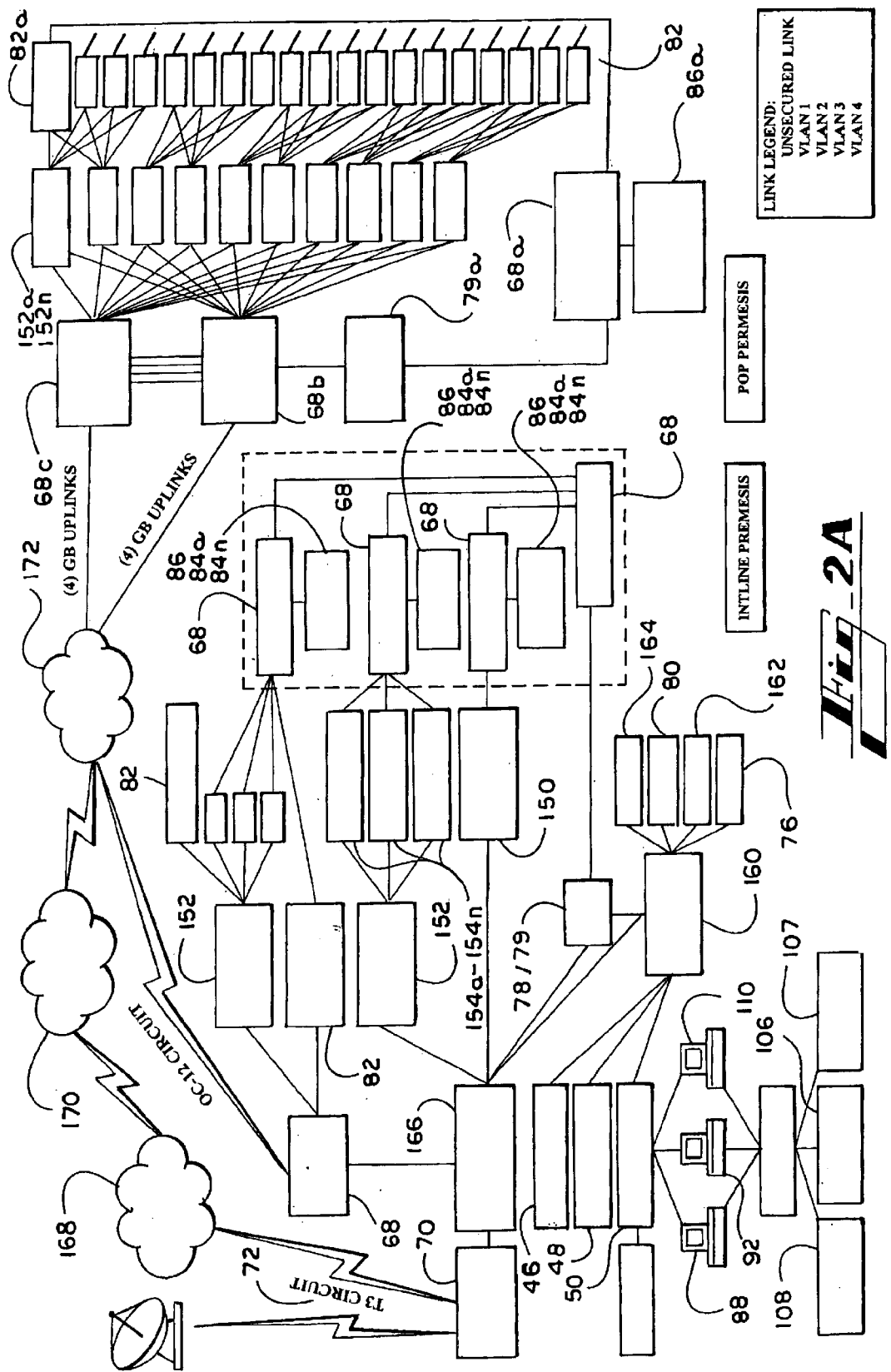

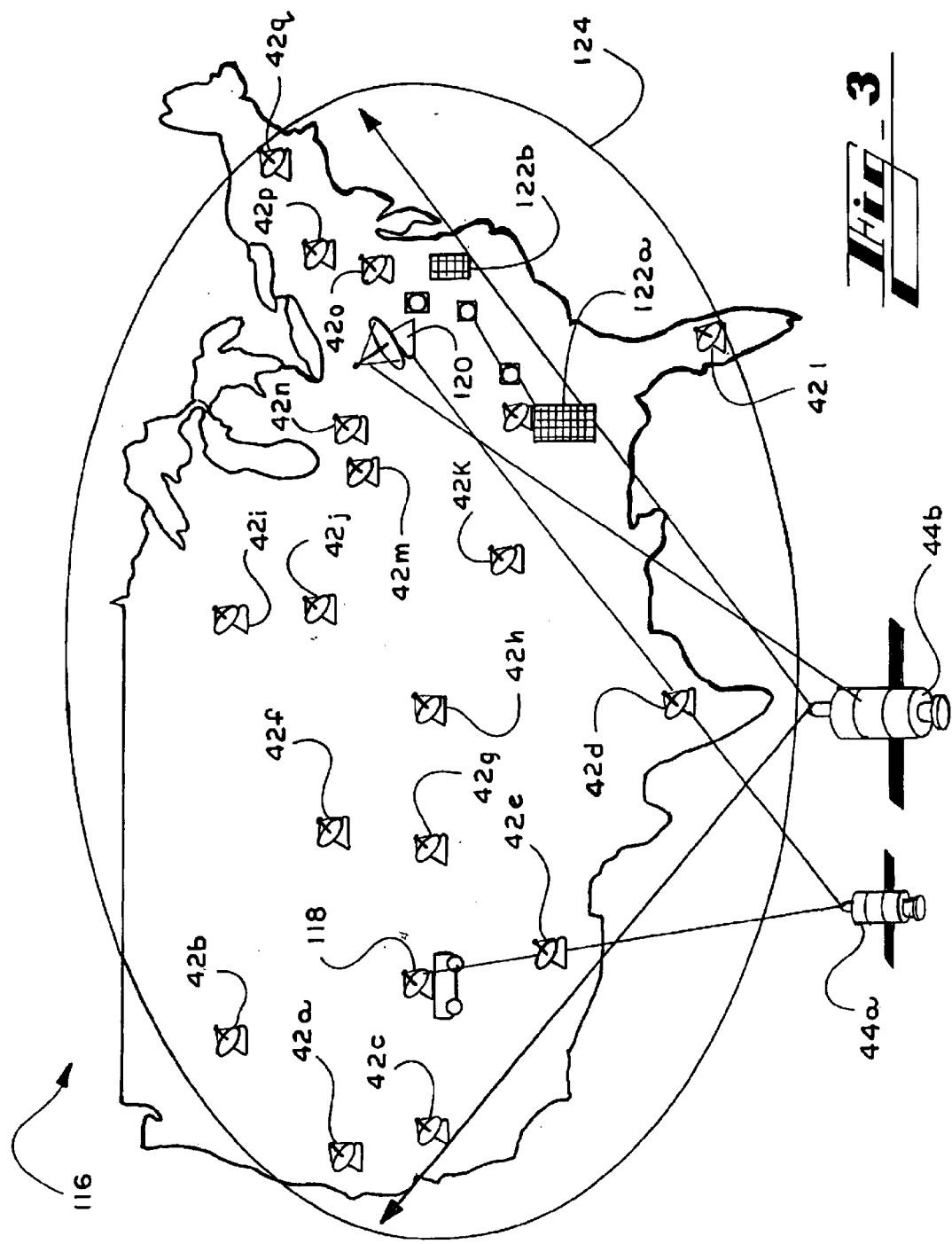

SYSTEM, DEVICE AND METHOD FOR COMBINING STREAMING VIDEO WITH E-MAIL

This application claims the benefit of provisional application No. 60/147,815, filed Aug. 10, 1999

BACKGROUND OF THE INVENTION

1. Field of the Invention

The invention relates generally to an e-mail system for simultaneously distributing a plurality of different video data streams across a network to a plurality of client recipient computers, wherein the video streams may be embedded into a web page that provides e-mail services, preferably over the Internet.

2. Discussion of Related Art

The Internet is a constantly evolving worldwide communication technology network. One of its limitations has been the ability to present quality audio/video presentations. Due to the limited ability of current technology to transfer data to the end user, the quality of audio and video presentation on the Internet has been considered poor.

In general, there are two modern approaches to "playing back" multimedia information located at a remote location, such as playing back a "video clip" on the Internet. Using the first approach, a client node downloads a file having the video information from a corresponding "website" or server node. The client node then plays back the information once the file has been completely transferred. Using the second approach, the server node "streams" the information to the client node so that the client may begin playback soon after the information starts to arrive at the client node.

"Streaming video" is an industry term that describes the manner through which video is sent across the Internet. Various client players can view this "streaming video" if the video stream is encoded in a manner consistent with the capabilities and requirements of the various client players' equipment. In practice, the video signal is digitized, compressed and then encoded just prior to being transmitted to the various client players.

Digitizing is an electronic process in which a continuously variable (analog) signal is changed, without altering its essential content, into a multi-level (digital) signal. The output of a digitizer has discretely defined levels or states.

Audio and video compression reduces the amount of digital data required to store and transmit videos. Content compression can be as simple as removing all extra space characters, inserting a single repeat character to indicate a string of repeated characters, and substituting smaller bit strings for frequently occurring characters. By reducing the amount of data, not only are storage requirements reduced, but the speed with which videos are transmitted is increased. When working with live video, pre-optimizing the lighting camera on the motion content of the video prior to compression reduces artifacts caused by the compression process. Video compression techniques enable the videos to be played on client workstations.

The standard compression technique used with videos delivered over high-speed networks is Motion Picture Experts Group (MPEG). MPEG-1 and MPEG-2 define integrated audio and video streams. That is, a video encoded by MPEG-1 and MPEG-2 uses a single bit stream for both the audio and the video components. Orderwire (OW) proprietary implementation specifies sub data rates of the SIF MPEG-1 format combined with low bit rate proprietary encoding schemes. Typically, MPEG-1 is encoded at 1.5 Mbps as a standard. Sub data rates for MPEG-1 below 500 Kbps are non-standard and are typically not supported by software decoders.

Encoding devices convert analog video to one of several digital compression formats. The encoder output is a file that may be permanently stored. Alternatively, the output can be distributed on a computer network and viewed in real time, captured by another system, or discarded. Digital video distribution supports pre-encoded video files. Digital video distribution also supports output from network streaming encoders that encapsulate MPEG video data within the User Datagram Protocol (UDP) transport protocol and transmit it in real time over a network.

Because there is no standard format for encoded video data on a computer network, the output of an encoder can be viewed or captured only by suitably equipped receiving decoder systems. Video players that can view live digital video feeds directly from a network are provided to the client's workstation. The video player on the client side then decodes the compressed video format before playing it on the workstation. For this reason, the client-side video players are also called video decoders.

Several common client-side video players are presently being used to view video streams. G2 Real Video provides low bit-rate streaming with average quality playback. Each stream will have a bit rate of less than 56 Kbps.

QuickTime 4.0 provides low bit rate streaming with good quality playback. Each channel will have 100 Kbps and 56 Kbps streams. The images are scalable to 320×240 at 10 fps.

WindowsMedia provides low bit rate streaming with good quality playback. Each channel will have 300 Kbps, 100 Kbps and 37 Kbps streams. The images are scalable to 320×240 at from 10 to 30 fps.

Q-SIF (Quarter Standard Image Format) MPEG-1 (Thin MPEG) provides low bit rate streaming with good quality playback. Each stream typically has a data rate of less than 300 Kbps. This type of streaming requires 167 Mbytes of storage for each hour based on data rates of 250 Kbits/s of 176×144 pixels image sizes. The images are scalable to 320×240 image sizes at 24–30 fps.

SIF MPEG-1 provides very good image quality with typical bit rates of 500 Kbps through 1.5 Mbps for image sizes of 352×288 pixels. This type of streaming requires 675 Mbytes of storage for each hour based on 1.5 Mbits/s data rates. The images are scalable to 640×480 at 30 fps, and the rate is supported by software decoders.

Presently, for transmitting data among computers on the Internet, Internet Protocol (IP) is the network layer for the IP Protocol Suite, a standard of the Internet Engineering Task Force (IETF). It is a packet-switching protocol that uses "best effort" for routing individual packets among hosts with no previously established communication path.

When IP is the standard used for transporting data among computers on the Internet, each computer on the network has an IP address that identifies it. The IP address consists of four octets represented in dotted decimal notation, such as 172.16.18.100. Multicast IP addresses are provided ranging from 224–239 (i.e. 224.xxx.xxx.xxx–239.xxx.xxx.xxx) in the final octet. Whereas the first octet denotes a multicast internet address.

With respect to transmitting video streams from a source/sender to a receiver/viewer, various transmission schemes are commonly employed. These transmission schemes utilize unicast and/or multicast UDP streams. Unicast streams are those sent from a sender to a single receiver. Multicast streams are those sent from a sender to multiple, simultaneous receivers.

Video on Demand (VoD) is a unicast transmission between the sender and the receiver. During a unicast transmission, a "channel" is exclusively established between the two parties. This channel is interactive in the sense that the receiver has the ability to play, fast-forward, rewind, pause, stop or start the video at any time. This application can be compared to functions of viewing videotape. The receiver/customer can order the tape at any time and control its playback dynamically.

Near Video on Demand (NVoD) is a scheduled multicast event. This technology is similar to watching a "pay-per-view" movie. A customer/viewer can select from a list of available programs on the video server and watch it at a scheduled time. The viewer will join an existing multicast group and will have no interaction on the playback of the video except for viewing the video as it plays.

Live Video Broadcasting (LVB) is another multicast application. This is analogous to what we see in traditional television broadcasting today. Live television broadcasts are compressed in "real-time" and transmitted over a multicast network. Again, the viewer has no interactive involvement in the playback of the broadcast, although the viewer can select a video from a list of available live broadcast streams.

Archive Video on Request (VoR) is a unicast application that may perform according to the Hypertext Transfer Protocol (HTTP) set of rules. Archive video can be downloaded by the customer/viewer as a video file from a video server. After the download is complete, the viewer can view the video at the viewer's convenience, and the viewer has complete control over the video playback.

It is apparent that a wide variety of methods exist for encoding and presenting video and audio data on the Internet. Similarly, a variety of methods exist by which a client computer can receive and view video/audio presentations.

Several attempts have been made to improve upon video streaming over the Internet by varying how data is transmitted from a server to a receiver, however, none disclose the proprietary encoding technique contemplated by this invention. However, to date no one player/decoder can view all known video encoding formats.

Several attempts have also been made to provide video that is included with an e-email message or embedded into a web page that provides e-mail service over the Internet. Additionally, attempts have been made to provide a system that simultaneously provides a video display and a text message on a computer screen.

U.S. Pat. No. 5,953,506 to Kalra et al. discloses a method and apparatus that provides a scalable media delivery system for a plurality of receiving client computers which can vary the rate and base and additive stream combinations. However, the data is stored in a single format, and this system is not capable of simultaneously providing different encoded formats based upon a server side determination.

U.S. Pat. No. 5,760,823 to Brunson et al. discloses a video messaging arrangement. The arrangement merely combines a telephony multi-media messaging system with a plurality of video workstations and a network to provide a rich set of video messaging features, thereby enabling users to access video messages from the system and/or insert video messages into the system.

U.S. Pat. No. 6,014,689 to Budge et al. discloses an e-mail system wherein the system multiplexes a video e-mail player with encoded and multiplexed video, audio, and text data. The system then transmits the multiplexed information via a digital network to at least one addressed recipient who executes the transmitted file to read the text message, view the video message and listen to the audio message. Although the system includes video combined with e-mail, the video is not provided in plural different encoding formats and the player is transmitted with the data.

U.S. Pat. No. 5,966,120 to Arazi et al. discloses a method and apparatus for combining and distributing data with pre-formatted real time video. Although the video and data may be sent to the same destination or various destinations, and plural video signals may be multiplexed and simultaneously transmitted, the apparatus does not specifically provide streaming video combined with e-mail messages, and the plural video signals are not encoded in different data compression techniques.

U.S. Pat. No. 5,999,985 to Sebestyen discloses a method and apparatus for storing, searching and playing back items of information in a multimedia electronic mail system. The multimedia multiplexing system merely enables a user to access various types of e-mail messages from a single location and does not simultaneously provide different video data stream formats.

While prior art discloses various systems for transmitting data to a plurality of receivers to improve transmission by varying rates, optimizing bandwidth use and ignoring endpoint capabilities, it fails to provide "streaming video" over the Internet in an e-mail system wherein the video stream data is distributed in an encoded format matching different player capabilities of plural client computers, simultaneously.

Additionally, while the prior art discloses e-mail systems capable of transmitting video messages, the prior art does not satisfy the need for a method and system for embedding streaming video into a web page on an e-mail system, wherein the video stream data is distributed in an encoded format matching different player capabilities of plural client computers, simultaneously. The present invention provides an e-mail system and method by which the data comprising the eventual video stream data is encoded in a proprietary manner to simultaneously meet the reception requirements of multiple client players. The e-mail system of the present invention then embeds the video stream data into an e-mail web page, displaying the video stream data simultaneously with e-mail text messages.

Finally, the present invention discloses an e-mail system for providing a calendar simultaneously with the video stream display and e-mail text message.

SUMMARY OF THE INVENTION

The present invention relates to an e-mail system for simultaneously distributing a plurality of different video data streams across a network to a plurality of client recipient computers. The system includes an encoder for encoding digitized data into a plurality of different video data stream formats and a smart server for determining when a client recipient computer accesses the e-mail system and the type of a video player residing on the client recipient computer. Once the determination has been made an optimum video data stream format for the video player of the client recipient computer is distributed to the client recipient computer.

It is, therefore, an object of the present invention to provide an e-mail system including a digitizer for digitizing video data streams, a means for compressing the digitized data and encoding the video data for simultaneously distributing a plurality of differently encoded video data streams across a network and via satellite, terrestrial and/or wireless techniques to a plurality of client recipient computers.

It is another object of the present invention to provide an e-mail system for simultaneously distributing a plurality of different video data streams across a network to a plurality of client recipient computers, wherein the plurality of different video data streams are encoded into a plurality of different video data stream formats.

It is a further object of the present invention to provide an e-mail system for simultaneously distributing a plurality of different video data streams across a network to a plurality of client recipient computers, wherein a smart server within the e-mail system determines the optimum video data stream format at which to transmit the data stream to the client computers that have accessed the e-mail system.

Still another object of the present invention is to provide an e-mail system for simultaneously distributing a plurality of different video data streams across a network to a plurality of client recipient computers, wherein the video originates from a live source or from a video archive.

Finally, it is an object of the present invention to provide an e-mail system for simultaneously distributing a plurality of different video data streams across a network to a plurality of client recipient computers while providing an audio component to be broadcast with the video display and providing a calendar to be displayed with the e-mail and the streaming video.

The objects will be accomplished while providing simultaneous delivery of the following services associated with compressed video: video on demand, near video on demand, live video broadcasting and archive video on request. Additionally, the objects will be accomplished while the system recognizes and provides video streams to the following client players: G2 Real Video, QuickTime 4.0, Q-SIF MPEG-1 (Thin MPEG), and SIF MPEG-1. Finally, the objects will be accomplished while providing both unicast and multicast UDP streams.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWINGS

FIG. 1 shows a flow diagram of the preferred embodiment of the present invention.

FIG. 2 shows a detailed block diagram of the preferred embodiment of the present invention.

FIG. 2A shows a more detailed block diagram of the video signal routing as shown in FIG. 2.

FIG. 3 shows a national satellite distribution system used in conjunction with the present invention.

DESCRIPTION OF THE PREFERRED EMBODIMENTS

Figure 1A:
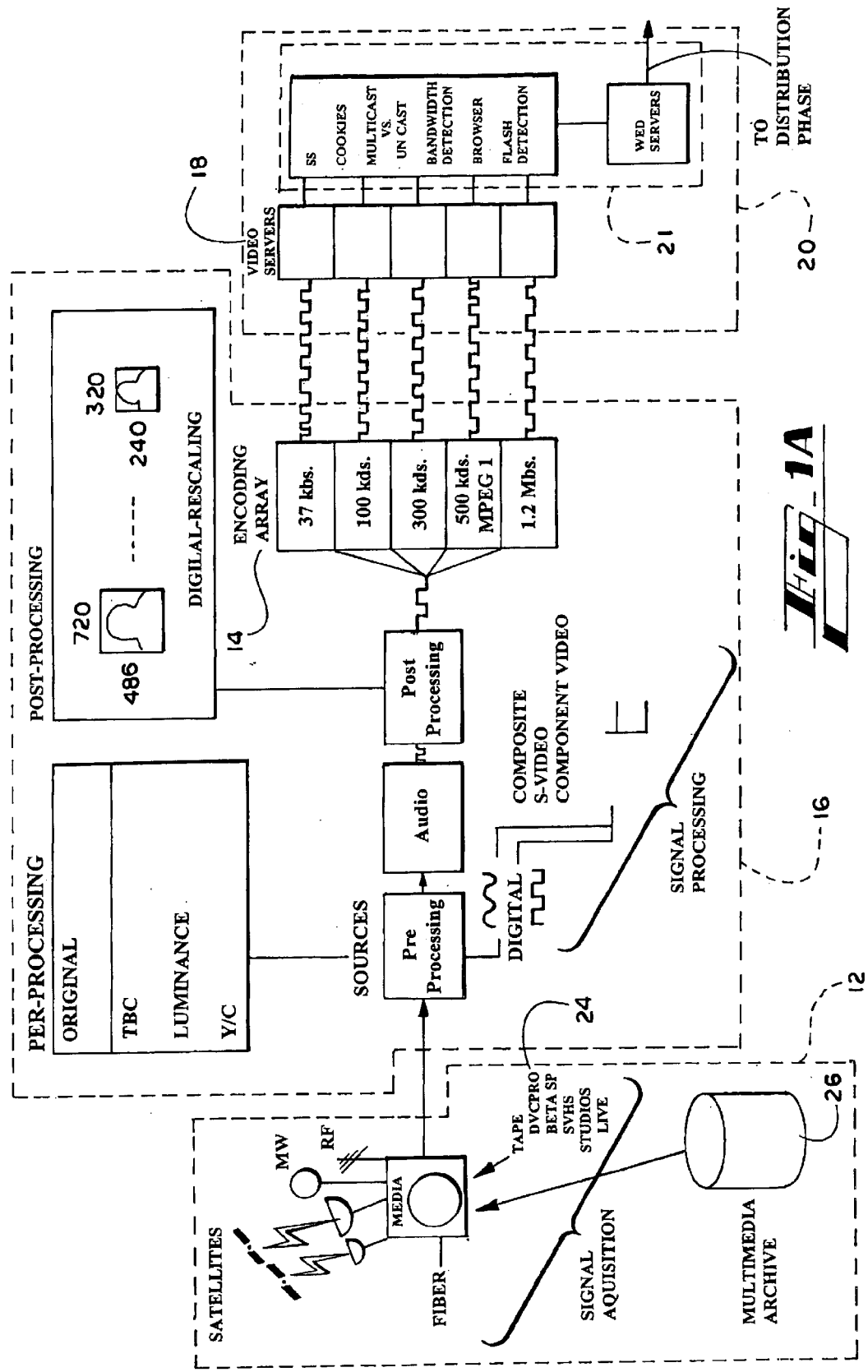
FIG. 1A shows a more detailed flow diagram of the system, as shown in FIG. 1, from video production to distribution.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIG. 1, a flow diagram of the preferred e-mail system of the present invention is disclosed. The e-mail system includes a multiple bit-rate audio/video streaming system 10 capable of encoding digitized data into a plurality of different video data stream formats and simultaneously distributing the data stream formats to various destinations. The multiple bit-rate audio/video streaming system 10 includes a content source 12, a real-time encoding system 14, a production network 16, a live multicast transaction system 18, a product distribution smart server 20, and a distribution system 22. The content source 12 may be a video camera 24 which provides a video signal of a live event. Alternatively, the content source 12 may be a video signal retrieved from storage in a multimedia archive 26. In both configurations, the video signal is provided in an analog form. However, it could be provided directly in a digital form.

The content source 12 is connected to the real-time encoding system 14. The real-time encoding system 14 comprises a plurality of encoding computers 28a–28f. The encoding computers 28a–28f each include a digitizer, a compressor and an encoder for digitizing, compressing and encoding, respectively, the analog signal into a unique bit-rate audio/video stream comprising one of a plurality of different video data stream formats. The encoding computers 28a–28f simultaneously convert the analog signal into various different formats, such as a 1.5 Mb MPEG-1 format, a 512 kbps MPEG-1 format, a 256 kbps MPEG-1 format, a 126 kbps QuickTime format, a 56 kbps QuickTime format, and a 56 kbps RealVideo format, respectively. It should be understood that other formats may be substituted for those formats shown in FIG. 1, or additional encoding computers could be connected to the real-time encoding system 14, and other formats may be used in addition to those formats shown in FIG. 1, such as those shown in FIG. 1A.

Referring to FIGS. 1 and 1A, the array 14 of encoding computers 28a–28f are part of production network 16 and are connected to the live multicast transaction system 18 which is part of the product distribution network 20. The production network 16 is comprised of a network segment that is IP multicast enabled across a 100 BaseT switched Ethernet network. This isolated multicast segment delivers simultaneous IP packets to encoder array 14 that capture the packetized video via the network interface card (NIC), then apply the designated CODEC and bitrate to the incoming bit stream. This process, comprised of digital rescaling from 720×486 to 320×240 image size prior to the encoding process, in conjunction with the IP multicast encoding process, provides unique clarity and overall quality in the video stream.

The live multicast transaction system 18 comprises a plurality of video servers 29a–29e. Each video server 29a–29e is dedicated to providing a specific streamed video signal format from an encoding computer 28a–28f to the distribution system 22 via the product distribution network 20. The live multicast transaction system 18 comprises a plurality of video servers 29a–29e. Each video server 29a–29e is dedicated to providing a specific streamed video signal format from an encoding computer 28a–28f to the distribution system 22 via the product distribution network 20. Since independent streams are created at various bit-rates, an auto-detect process as part of a "smart server" 21 has been developed that tests users bandwidth at the time of request to ensure the optimum bit stream is served to the end users utilizing the maximum available bandwidth. There are several stages to the "smart server" and "auto-detection" processes used to make each site visit as entertaining and effortless as possible for the novice and the experienced user. The very first detection that is performed determines if the user has the correct plug-ins to be able to view our site. Our "smart pages" first determine which browser is being used which allows us to determine whether or not the Player plug-ins are present. If the plug-ins are missing, the user is sent to a "smart download page" that walks them through installing the software they need. If both plug-ins are present, the user is sent to the next stage of auto-detection: Multicast Ability.

At this stage the user is sent a short streaming media file to determine if they are able to receive multicast signals. At this point, a cookie is set recording user settings up to this point so they will not have to go through this process again. Now the user is sent to a "smart bandwidth detection" page.

At the bandwidth detection page, a fixed size of data is sent down to the user and the time it takes to download is recorded. Based on this data vs. time ratio, the user is either delivered to the 37 Kbps assets (if their download time was above a certain limit) or sent to the next stage of the bandwidth detection that will do the same data transfer test to determine if the user is able to handle 100 Kbps or 300 Kbps or greater assets. The bandwidth detection is a non-intrusive quick test that is done each time a user visits the website. The reason for not setting a cookie here is to allow the user to see the best possible video based on his connection, which can often change depending on network traffic, time of day connecting, etc. Simultaneously, the encoding computers 28a–28f transmit a digitized, compressed and encoded video signal to the live multicast transaction system 18.

The distribution system 22 comprises a premesis router 30, terrestrial communication equipment 32, satellite communication equipment 34, a multicast-enabled Internet service provider 36 and a plurality of client recipient computers 38a–38e capable of receiving various audio/video stream formats. The premesis router 30 performs as an input device for the distribution system 22. The premesis router 30, which is connected between the terrestrial communication equipment 32 and the satellite communication equipment 34, also performs as an interface device between the product distribution smart server 20, the terrestrial communication equipment 32 and the satellite communication equipment 34.

As part of the e-mail system, the multiple bit-rate audio/video streaming system 10 includes the distribution system 22 capable of transmitting the various audio/video streaming formats. Audio/video streams received by the premesis router 30 may be transmitted via the terrestrial communication equipment 32. The terrestrial network protocols are uniquely configured to first deliver an IP multicast stream if the requestor is multicast enabled to the multicast-enabled Internet service provider 36.

The multicast-enabled Internet service provider 36 makes the various audio/video stream formats available to the plurality of client recipient computers 38a–38e, each including a video player 39a–39e. Each client computer 38a–38e may have T1/T3 WAN connect capabilities, direct-connect cable modem/ASDL capabilities, ISDN Modem QuickTime 128 kbps capabilities, or dial-up modem QuickTime 56 kbps capabilities. However, the multiple bit-rate audio/video streaming system 10 will be capable of transmitting other audio/video streaming formats without departing from the spirit of the invention.

The satellite communication equipment 34 includes a satellite transmitting dish 40 which communicates with a satellite receiving dish 42 via a satellite 44. The satellite receiving dish 42 is connected to the multicast-enabled Internet service provider 36 via appropriate communications hardware, preferably a T1/T3 WAN. Thus, video signals provided via the satellite communication equipment 34 may eventually be provided to an end user via the multicast-enabled Internet service provider 36.

Referring again to FIGS. 1 & 1A, the multiple bit-rate audio/video streaming system 10 operates according to the following procedure. First, the multiple bit-rate audio/video streaming system 10 transforms the source content, a video/audio presentation from the multimedia archive 26, video camera 24 or other audio/video feed, from the source's present form to one that can be transmitted over the Internet. This encoding process entails changing the data from an analog signal to a digital signal. Digitizing is accomplished by inputting the source data into either; a digital-capable video production switcher, then to a digital rescaler to resize the image and initiate a multicast IP stream; or directly to the analog signal, rescale and compress it into multiple digital bit rates and streams. Then, the plurality of different video data stream formats are transferred to the video servers 29a–29e. The video servers 29a–29e send each of the plurality of different video data stream formats over the Internet via the terrestrial communication equipment 32 and the satellite communication equipment 34.

Video servers 29a–29e employ UDP transport streams for transmitting MPEG-1 system, MPEG-4, Windows Media streams, QuickTime streams and Real Video G2 streams between two host systems over conventional IP-based networks. The video servers 29a–29e transmit simultaneously to multiple destinations using IP multicast. Although UDP transmission provides no capability for error control or recovery and no tolerance for network topologies that reorder packets, UDP provides a sufficiently reliable service for video applications where issues of latency, multicasting and join-in-progress behavior outweigh the need for reliable delivery. This is the situation with the present invention.

The video servers 29a–29e support client capability-based streaming. Each client recipient computer 38a–38e specifies its hardware and software capabilities, which includes encoding format and rate, to a video server 29a–29e, via the smart server 21 at the beginning of a session through back channel signaling. The back channel signaling, in systems such as MPEG-1 and MPEG-2, may be extra unused bits in the bit streams that are transmitted from the players/decoders 38a–38e to the encoding computers 28a–28f via the smart server 21. Based upon the capabilities, the product distribution smart server 20 determines the optimum video data stream format for the video player 39a–39e of the client recipient computer 38a–38e communicating with the product distribution smart server 21. The client recipient computers 38a–38e each include a video player 39a–39e that is one of the following types: G2 Real Video, Windows Media, QuickTime 4.0, Q-SIF MPEG-1, or SIF MPEG-1. However, other types of players may be used as necessary.

Each video server 29a–29e determines the type/format of player/decoder and the appropriate encoded bit-rate at which to send the video and audio streams to a respective client recipient computer 38a–38e. The video servers 29a–29e are now prepared to multicast the video and audio streams to the client recipient computers 38a–38e to be played by the video players 39a–39e located within the client recipient computers 38a–38e.

Network addressing used during multicasting specifies a Time-To-Live (TTL) value. TTL limits the range of multicast packets. The TTL value is limited by assigning a TTL integer value less than 127. [TTL ranges are provided by the Internet Engineering Task Force (IETF).] This number equals the maximum number of hops (routers) that a packet may take to reach the client from the server.

Multicast routing protocol (i.e. Protocol Independent Multicast-Sparse Mode (PIM-SM) or Protocol Independent Multicast-Sparse/Dense Mode (PIM-SDM)) will be deployed across the Internet network(s) for signaling between backbone rendezvous points. The present invention relies on Multicast Source Discovery Protocol (MSDP) which is a near-term solution for connecting shared trees without the need for interdomain shared trees (it is planned that the Border Gateway Multicast Protocol, BGMP, is the long-term solution). MSDP is applicable to shared tree protocols such as PIM-SM and CBT, as well as other protocols that keep active source information at the borders (e.g., Multicast Open Shortest Path First (MOSPF) or PIM-DM with DWRs). The present invention relies on peering between Intra-domain rendezvous points within backbone Internet networks and IP multicast peering networks supporting native multicasting. The present invention will rely upon backbone implementation of Multicast Border Gateway Protocol (MBGP) for Inter-domain and Intra-domain multicast routing and will use a collocation router to provide rendezvous services. The Multicast BGP (MBGP) feature enhances BGP to enable multicast routing policy throughout the Internet and to connect multicast topologies within and between BGP autonomous systems. MBGP is an enhanced BGP that carries IP multicast routes. BGP carries two sets of routes, one set for unicast routing and one set for multicast routing. The routes associated with multicast routing are used by the Protocol Independent Multicast (PIM) to build data distribution trees.

In operation, the multicasting process of the present invention simultaneously delivers the following services associated with compressed video: Video on Demand (VoD), Near Video on Demand (NvoD), Live Video Broadcasting (LVB), and Archive Video on Request (VoR).

The multiple bit-rate audio/video streaming system 10 transmits video signals via programming channels comprising multiple bit rates that define the multicast content. During the video signal transmission, a range of compression formats and bit rates are targeted at multiple network architectures. No additional network overhead is associated with the implementation of multiple bit rates per channel since each format will function independently as its own multicast channel within a programming channel. A single programming channel is comprised of multiple formats and bit rates ranging from 37 Kbps, 100 Kbps, 300 Kbps MPEG-4, in Windows Media, RealVideo, and Quicktime formats, through Q-SIF MPEG-1 (Thin MPEG) (<300 Kbps), and SIF MPEG-1 (500 Kbps–1.5 Mbps).

The process employs multicast-based services requiring a multicast-enabled network. In some cases, an intermediate network that is not multicast-enabled can be bypassed for multicast purposes through use of a multicast tunnel.

IP network interfaces determine whether they are multicast-enabled. The fact that the network interface at the server is multicast-enabled does not necessarily mean that the network path to a particular client is multicast-enabled throughout its entire length. Again, this is circumvented by the strategic placement of receive-only satellite dishes to inject multicast content at multicast-enabled network segments.

Land based connectivity is gained through a connection to a multicast enabled Tier 1 backbone POP via a local loop 72 as shown in FIGS. 2 & 2A. Additional entry into a land based ISP is obtained through use of strategic placement of satellite receive-only dishes 42a–42q, FIG. 3, at dispersed ISP POP's globally. Routers, as discussed below with reference to FIG. 2, provide land based connectivity to accommodate content dissemination.

Satellite based connectivity is gained through a process which delivers web-based content to a satellite service provider's IP multicast satellite-based network, part of the satellite communication equipment 34, from both fixed and remote broadcast locations. Access may be gained through either a land-based connection or a satellite backhaul connection to the satellite service provider's facility.

Dispersed ISP's with IP multicast enabled platforms will disseminate IP multicast content to connected consumers and businesses via the satellite communication equipment 34. The process will deliver IP multicast traffic to the satellite service provider IP multicast platform location in the United States via a satellite or terrestrial backhaul connection. A receiving dish 42a–42q will be installed at the dissemination point. National or regional ISP's receiving the IP multicast group will deliver the traffic to one or more multicast enabled routers or broadband servers within the administrative domain of that ISP.

With Reference to FIG. 2, a detailed block diagram of a real-time encoding system 14 is disclosed. FIG. 2A shows a more detailed block diagram of the video signal routing. Referring again to FIG. 2, the system is configured such that it interconnects equipment in a plurality of rooms, including a server/communications room 46, a main graphics/development room 48, an encoder/broadcast/production control room 50, a producer's office 52, an accountant's office 54, an editor's office 56 and a block of rooms 58 comprising a CEO's office 60, a receptionist's office 62, a conference room 64 and a small office 66.

At the center of the real-time encoding system 14 is an Ethernet switch 68, preferably a 36 port Cisco 10/100 fast Ethernet switch. The Ethernet switch 68 is connected to a DS-3 local loop 72 via a router 70, preferably a Cisco router.

The DS-3 local loop 72 connects the real-time encoding system 14 to a multicast enabled Tier 1 backbone POP 74, which establishes a communication connection with satellite uplink and Internet unicast sources. Additional entry into land-based ISP's is obtained through use of strategic placement of satellite receive-only dishes at globally dispersed ISP POP's.

The Ethernet switch 68, located in the server/communications room 46, in addition to being connected to the router 70, is also connected to equipment in the server/communications room 46 and the other rooms. Equipment in the server/communications room 46 to which the Ethernet switch 68 is connected includes a phone network server 76, a proxy server 78, a web/mail server 80, a video server 82 and a plurality of video server databases 84a–84n. The video server databases 84a–84n, which are also connected to a disk storage device 86, are capable of retrieving data from the disk storage device 86.

Referring again to FIG. 2, the main graphics/development room 48 includes equipment which is connected to the Ethernet switch 68. The main graphics/development room 48 includes a 400 MHz graphics workstation 88, two 450 MHz software development workstations 90a–90b, a 450 MHz graphics workstation 92, a 400 MHz software development workstation 94 and a 266 MHz research workstation 96. The Ethernet switch 68 interconnects the workstations with the various other equipment in the real-time encoding system 14.

The producer's office 52 contains a 450 MHz multimedia workstation 98 and a laptop computer 100, both of which are connected to the Ethernet switch 68. The accountant's office 54 includes a 300 MHz accounting workstation 102 interconnected with the Ethernet switch 68. The encoder/broadcast/production control room 50 includes a plurality of various encoders 104a–104k, a 400 MHz on-line production switch device 106, a 400 MHz off-line production switch device 108 and a 400 MHz video capture device 110, each of which are connected to the Ethernet switch 68. The editor's office 56 includes a 112 attached to the Ethernet switch 68. Finally, the block of rooms 58 including the CEO's office 60, the receptionist's office 62, the conference room 64 and the small office 66 are interconnected with the Ethernet switch 68 via a shared Ethernet ring 114. The various equipment interconnected with the Ethernet switch 68 enables system operators to develop, encode, edit, produce and broadcast live video or archived video, simultaneously multicasting the video to a plurality of users using various video streaming formats.

Referring to FIG. 2A, a more detailed block diagram of the video signal routing is disclosed. The system is configured such that it interconnects equipment in a plurality of rooms, including a data center, communications, multimedia, online/offline encoding centers, broadcast studios, and production control rooms.

To provide land-based connectivity, a network switch is connected to a local loop via a router. The router provides the interchange of both multicast and unicast traffic in order to establish land-based connectivity. Channel capacity will be allocated across the identified ISP backbone to accommodate content dissemination.

The local loop connects the real-time encoding system to a multicast enabled Tier 1 backbone POP, which establishes a communication connection with satellite uplink and Internet unicast sources. Additional entry into land-based ISP's is obtained through use of strategic placement of satellite receive-only dishes at globally dispersed ISP POP's.

The switch 68, located in the server/communications room, in addition to being connected to the router 70, is also connected to equipment in the server/communications room and the other rooms. Equipment in the server/communications room to which the switch is connected includes a proxy server 78, firewall 79, a web/mail server 80, multiple video servers 82a–82n and a plurality of server databases 84a–84n and load balancers 152. The video server databases 84a–84n, which are also connected to a disk storage device 86, are capable of retrieving data from the disk storage device 86.

Referring again to FIG. 2A, the detailed video signal routing diagram includes additional equipment. The equipment, configured as part of the Intline Premesis or the remote POP Premesis, operators to develop, encode, edit, produce and broadcast live video or archived video, simultaneously multicasting the video to a plurality of users using various video streaming formats. The interconnected equipment includes workstations 88,92 and a video capture device 110 connected to a production switch devices 106, 108 via a back-channel device 156. The workstations 88, 92, located within control rooms, are connected to a broadcast file server 158. The rooms shown include a server/communications room 46, a main graphics/development room 48 and an encoder/broadcast/production control room 50. The rooms are interconnected and connected to other equipment via an internal backbone 160.

The internal backbone 160 is connected to a telephone server/remote access server (RAS) 76, a file server 162, a BDC/mail server 150 and a primary domain controller 164. These servers and controller perform in a manner similar to other such servers and controllers as are known in the art.

A proxy server (PS/FW) 78 is also connected to the internal backbone 160. This proxy server interfaces a non-video production backbone 68 with a back-channel switch 68 associated with other back-channel switches 68. The back-channel switches 68 connect video server databases 84a–84n and disk storage devices 86 to the Mail1st block architecture 150, E-Commerce servers 154a–154n and video servers 82a–82n.

The E-Commerce servers 154a–154n and video servers 82a–82n are connected to the switch/router 68 or the non-video production backbone 166 via a load balancer 152a–152n. The load balancers 152a–152n evenly distribute information passing between a switch/router 68 and the video servers 82a–82n to prevent congestion in the system.

Information passing through the load balancers 152a–152n passes through the non-video production backbone 166. The non-video production backbone 166 is connected to the router 70 which provides communications with the satellite uplink and/or the local loop 72. When transmitted via the local loop 72, the information passes through the Above.Net site 168 to the Internet 170. As an alternative to routing the information as described above, the router/switch 68 may transmit information via an OC-12 circuit 174.

Information may also pass to the Internet 170 through a Colocation network 172, additional switch/routers 68b, 68c and load-balancers 152a–152n from video servers 82a–82n. These additional switch/routers 68b, 68c are connected through a firewall 79a to an additional switch 68a and disk storage device 86a.

Referring to FIG. 3, a national satellite distribution system 116 diagram for the multiple bit-rate audio/video streaming system 10 is disclosed. Satellite-based connectivity is gained through a process which delivers web-based content to Satellite Service Provider's IP multicast satellite-based network services from both fixed and remote broadcast locations. Access will be gained through either a land-based connection or satellite backhaul connections to the Satellite Service Provider's facility.

Dispersed ISP's with IP multicast enabled platforms will disseminate IP multicast content to connected consumers and businesses via satellite. The process will deliver IP multicast traffic to the Satellite Service Provider IP multicast platform location in the United States via a satellite or terrestrial backhaul connection. A receiving dish will be installed at the dissemination point.

National or regional ISP's receiving the IP multicast group will deliver the traffic to one or more multicast enabled routers or broadband servers within the administrative domain of that ISP.

The satellite distribution system 116 shown in FIG. 3 comprises a fly-away remote uplink dish 118, a plurality of satellites 44a–44b, a primary back-haul uplink satellite dish 120, a plurality of POP's 122a–122b, and a plurality of satellite receiving dishes 42a–42q distributed around the United States. The satellite distribution system 116 provides audio/video streaming to users located within a defined satellite distribution area 124.

Video information is provided by the fly-away remote uplink dish 118 via a first leg uplink to a first satellite 44a, which transmits the video information to the primary back-haul uplink satellite dish 120 via a second leg downlink. The primary back-haul uplink satellite dish 120 transmits the video information to a second satellite 44b via a third leg uplink. Finally, the second satellite 44b transmits the video information to a plurality of satellite receiving dishes 42a–42q via fourth leg coverage feeds. The video information is then transmitted to end users via POP's 122a and 122b. The video is now available for viewing by the various viewers.

Figure 4:
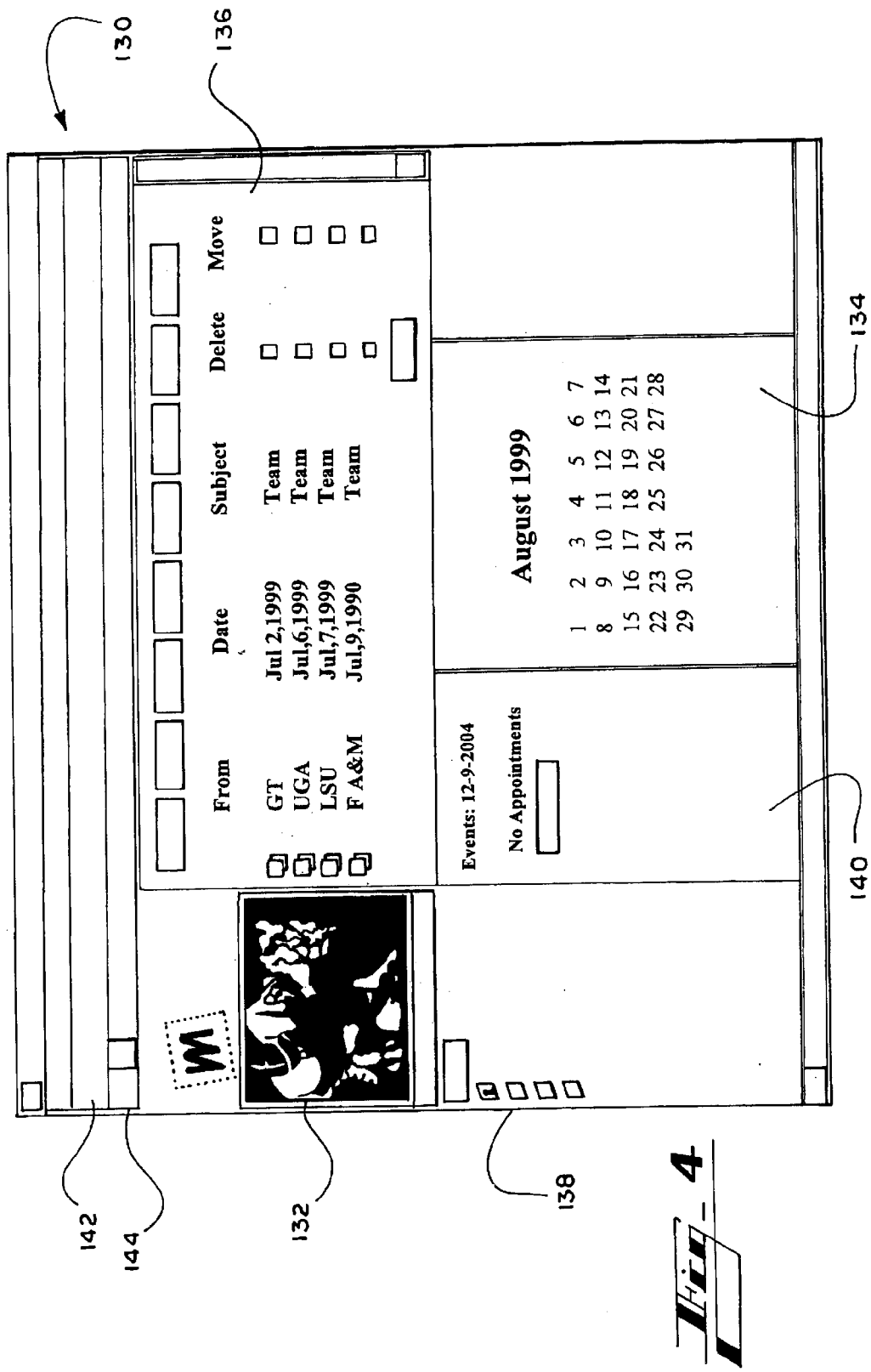
FIG. 4 shows a perspective view of an e-mail web page with an embedded screen for streaming video and an embedded calendar.

FIG. 4 shows a perspective view of a typical display of an e-mail web page 130 provided by the client recipient computers 38a–38e as received from the e-mail system. The display includes an embedded streaming video screen 132, an embedded calendar 134 and a typical e-mail message status display 136. Included with the embedded streaming video screen 132 are several video control selector icons 138. The display also includes a typical Internet control panel 142 and a web page address line 144. A viewer utilizes the Internet control panel 142 and the web page address line 144 to access and display the e-mail web page 130 containing the embedded streaming video screen 132, the embedded calendar 134 and the e-mail message status display 136.

When a viewer utilizes the e-mail system to access the e-mail web page 130 containing the embedded streaming video screen 132, the viewer may use the video control selector icons 138 to control the video display. Initially, the product distribution smart server 20 determines the viewer's video player 39a–39e type and the optimum video data stream format to send to the video player 39a–39e. Then, an appropriate video server 29a–29e transmits the optimum video data stream format to the viewer's video player 39a–39e. The video player 39a–39e located within the viewer's client recipient computer 38a–38e then presents the video display on the viewer's embedded streaming video screen 132. A viewer may utilize the video control selector icons 138 to play, fast forward, rewind, pause and stop the video as desired.

By accessing the e-mail web page 130, a viewer may retrieve the e-mail message status display 136. The e-mail message status display 136 enables a viewer to send, receive, save and delete e-mail messages as desired.

The e-mail web page 130 also provides the embedded calendar 134 including a calendar event display 140. This calendar is provided by the e-mail system via the multiple bit-rate audio/video streaming system 10. A viewer may use the embedded calendar 134 and the calendar event display 140 to schedule and track times and dates of appointments, meetings and special events. A viewer may enter information into the calendar event display 140, and the web page provider stores the information and makes it available when the viewer accesses the e-mail web page 130.

Figure 4A:
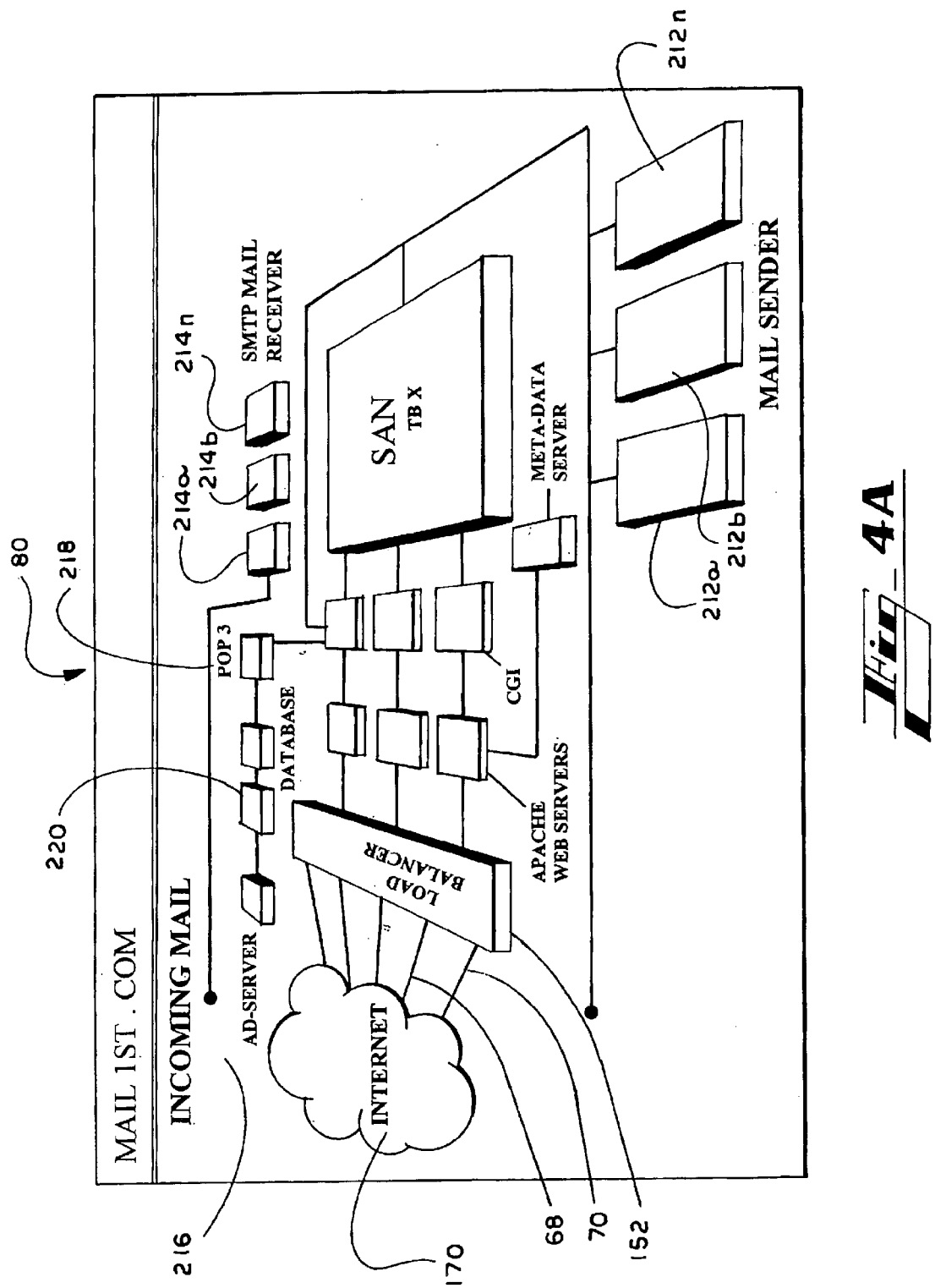
FIG. 4A shows a block diagram of the e-mail web page system provided by the present invention.

With reference to FIG. 4A, a block diagram of the e-mail web page system provided by the present invention is shown. The e-mail system is includes equipment interfaced with the Internet 170. The equipment, represented as a web/mail server 80, can be categorized into equipment used to access e-mail and equipment used for sending e-mail. Additionally, there is standard equipment that interfaces with both the e-mail accessing equipment and with the e-mail mail sending equipment.

As mentioned above, the equipment is interfaced with the Internet 170 via the router 70 and switch 68. The router 70 and switch 68 connects the Internet 170 to the e-mail accessing equipment. The e-mail accessing equipment includes a load-balancer 152, web servers 200, common gateway interfaces (CGI's) 202a–202n, a storage area network (SAN) 204 and a meta-data driver 206. The load-balancer 210 is connected to the SAN 204 via the web servers 200 and the CGI's 202a–202n. Information downloaded from the Internet 170 passes through the load-balancer 210, the web servers 200 and the CGI's to be stored in the SAN 204.

The e-mail output equipment includes a plurality of mail senders 212a–212n interfaced with the SAN 204, a CGI 202a and the standard equipment located within the web/mail server 80. The standard equipment to which the mail senders 212a–212n includes a plurality of mail receivers 214a–214n, an in-house AD-server 216, a post-office protocol (POP) 218 and a database manager 220, preferably an Oracle 8i database manager. The standard equipment control the information received by the web/mail server 80 and the information transmitted by the web/mail server 80.

Generally, the e-mail message status display 136 operates in a manner similar to typical e-mail message delivery services and in accordance with techniques commonly used and accepted by those persons skilled in the art. The preferred protocol of the present invention is simple mail transfer protocol (SMPT).

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. E-mail system for simultaneously distributing a plurality of different video data streams with different formats across a network to a plurality of client recipient computers, comprising:
    encoder for encoding digitized data into a plurality of different video data stream formats;
    a smart server determining, when a client recipient computer accesses the e-mail system; a video player type residing on the client recipient computer and an optimum video data stream format for the video player of the client recipient computer and thereafter distributing the optimum video data stream format according to the determination; and
    an e-mail web page provided to the client recipient computer, the e-mail web page including e-mail text messages and a streaming video screen adapted to display the optimum video data stream format.

2. The e-mail system of claim 1, further including a digitizer for digitizing video data streams.

3. The e-mail system of claim 1, further including a means for compressing the digitized data.

4. The e-mail system of claim 1, which can simultaneously transmit a plurality of different video data stream formats to a plurality of client recipient computers at the optimum video data stream format for the video player of each of the client recipient computers.

5. The e-mail system of claim 4, further comprising a process residing on the smart server, the process including instructions to test the bandwidth on each of the plurality of client recipient computers at the time of a video e-mail request to ensure that the optimum bit stream is served to each of the plurality of client recipient computers, utilizing maximum available bandwidth.

6. The e-mail system of claim 5, wherein the instructions to test the bandwidth further comprise:

sending a fixed size of data to each of the plurality of client recipient computers;

recording the time each of the plurality of client recipient computers takes to download the fixed size of data; and based on a ratio of the data versus time, delivering a bits per second asset.

7. The e-mail system of claim 5, wherein the instructions to test the bandwidth further comprise testing the multicast capability of each of the plurality of client recipient computers.

8. The e-mail system of claim 1, wherein the distributing occurs by storing at least one of the different video streams in a memory device and transmits the plurality of various video data streams to video players in the client recipient computers.

9. The e-mail system of claim 1, further including receiving the data in analog form from a device that captures the data in a live event and then digitizing.

10. The e-mail system of claim 1, further including receiving the data in analog form from a device that captures the data from a storage device and then digitizing.

11. The e-mail system of claim 1, further including digital calender data and simultaneously distributing the calender data with the video data streams, thereby enabling the calender data to be displayed simultaneously with the video data stream on the client recipient computers.

12. The e-mail system of claim 1, which includes distributing a plurality of multiple bit-rate video data streams which contain an audio component.

13. An e-mail web page residing on a client computer for displaying e-mail message and streaming video, comprising:

a text section displaying e-mail message status; and a streaming video screen displaying video stream data that has been optimized by a smart server process for providing optimum video data stream format for a video player residing on the client computer when the client computer accesses an e-mail system, the process including instruction to:

test the optimum bandwidth of the client computer; and determine if the client computer is multicast capable;

wherein the e-mail system distributed simultaneously to a plurality of client computers e-mail web pages with optimum video streams matching the capabilities of the players of the plurality of client computers.

14. The web page as claimed in claim 13, further comprising a control panel.

15. The web page as claimed in claim 13, further comprising a web page address line.

16. The web page as claimed in claim 13, further comprising video control selector icons.

* * * * *